(12) United States Patent
Lin et al.

(10) Patent No.: US 9,928,334 B2
(45) Date of Patent: Mar. 27, 2018

(54) REDISTRIBUTION LAYER ROUTING FOR INTEGRATED FAN-OUT WAFER-LEVEL CHIP-SCALE PACKAGES

(71) Applicant: AnaGlobe Technology, Inc., Hsinchu (TW)

(72) Inventors: Bo-Qiao Lin, Taipei (TW); Ting-Chou Lin, Taipei (TW); Chun-Yi Yang, Hsinchu County (TW); Yao-Wen Chang, Taipei (TW)

(*) Notice: Subject to any disclaimer, the term of this patent is extended or adjusted under 35 U.S.C. 154(b) by 34 days.

(21) Appl. No.: 15/222,968

(22) Filed: Jul. 29, 2016

(65) Prior Publication Data
US 2018/0032660 A1    Feb. 1, 2018

(51) Int. Cl.
G06F 17/00        (2006.01)
G06F 17/50        (2006.01)

(52) U.S. Cl.
CPC ...... *G06F 17/5077* (2013.01); *G06F 17/5009* (2013.01); *G06F 2217/40* (2013.01)

(58) Field of Classification Search
USPC ........................................... 716/129
See application file for complete search history.

(56) References Cited

U.S. PATENT DOCUMENTS

| 2005/0070083 A1* | 3/2005 | Johnson | H01L 24/13 438/612 |
| 2009/0001495 A1* | 1/2009 | Weng | H01L 27/14618 257/433 |
| 2010/0265977 A1* | 10/2010 | Kwon | B82Y 20/00 372/45.01 |
| 2012/0028436 A1* | 2/2012 | Or-Bach | G11C 17/14 438/401 |

OTHER PUBLICATIONS

Bo-Qiao Lin, "A Redistribution Layer Routing System for Integrated Fan-Out Wafer-Level Chip-Scale Packages", Master's Oral Defense on Jun. 24, 2016 in National Taiwan University, Taipei, Taiwan, R.O.C.

* cited by examiner

*Primary Examiner* — Mohammed Alam

(57) ABSTRACT

A method for redistribution layer routing is proposed. The method at least comprises inputting information regarding a redistribution layer layout, at least one netlist, and a constraint file. Next, it is creating a concentric-circle model based on the information, the netlist and the constraint file. Subsequently, it is assigning at least one pre-assignment net to at least one redistribution layer according to the concentric-circle model. Finally, the redistribution layer routing is performed.

16 Claims, 5 Drawing Sheets

REDISTRIBUTION LAYER ROUTING FOR INTEGRATED FAN-OUT WAFER-LEVEL CHIP-SCALE PACKAGES

BACKGROUND OF THE INVENTION

Technical Field

The present invention relates to a redistribution layer routing, and more particularly, to a redistribution layer routing for integrated fan-out wafer-level chip-scale packages.

Description of Related Art

With the increasing design complexity, many advanced packaging technologies have been proposed for system integration recently. Among these advanced packaging technologies, the integrated fan-out (InFO) wafer-level chip-scale package (WLCSP) provides a promising alternative with a small form factor, a better signal-to-noise ratio, and improved thermal characteristics.

A multi-chip InFO WLCSP uses micro-bumps and redistribution layers (RDLs) to connect neighboring chips. RDLs are the top metal layers of a chip, and multiple chips share the same RDLs in a multi-chip InFO WLCSP. In modern IC designs, I/O pads are usually placed along the boundaries of chips, called peripheral I/Os, and the RDLs are used to redistribute I/O pads to bump pads or connect I/O pads among different chips. Accordingly, an RDL router is needed to connect I/O pads to the I/O pads in other chips or the bump pads in the same chip or the fan-out region not covered by any chip.

RDLs under a multichip InFO WLCSP are divided into two regions: (1) the fan-in region, which is the region directly underneath chips, and (2) the fan-out region, which is the region that does not belong to the fan-in region. Therefore, I/O pads can be redistributed to the fan-out region outside the chips to increase the pin count. Furthermore, passive devices such as inductors and capacitors can be formed over molding compound for lower substrate loss and higher electrical performance. Molding compound also provides physical protection for the chips.

A typical RDL structure for conventional flip-chip designs with peripheral I/O pads contains only one chip with no fan-out region. Depending on the interactions among IC, packaging, and PCB designers, there are three types of conventional RDL routing problems: (1) the free-assignment routing problem, (2) the pre-assignment routing problem, and (3) the unified-assignment routing problem. For the free-assignment routing problem, the assignment between I/O pads and bump pads are not predefined by designers. For the pre-assignment problem, in contrast, connections between I/O pads and bump pads are predefined by designers. For the unified-assignment problem, some connections between I/O pads and bump pads are predefined while the others are not.

Although some related techniques on the RDL routing problem for conventional flip-chip designs are well developed, multiple chips and multiple layers of the RDL routing remain unresolved. One of reasons is that the type of connections with multiple chips and multiple layers is complicated and different from conventional one-chip designs. In addition to the original free-assignment connections, which connect I/O pads to bump pads to transmit signals into or out of a package, another type of connections under a multi-chip InFO WLCSP connects two I/O pads of different chips to directly transmit signals. In this addressed problem, the connections between I/O pads are predefined because the functions of I/O pads are typically predefined by IC designers.

To solve the RDL routing with multiple chips and multiple layers, one could extend the conventional technique to handle multiple layers, modifying a flow network for multiple layers by duplicating the vertices and edges of the original network for each layer. However, the modified method leads to inevitable long detours, low routability and additional runtime. These deficiencies are caused by two reasons: (1) its congestion estimation does not consider pre-assignment nets, and (2) there exist net ordering problems for pre-assignment nets. To remedy the deficiencies of poor interactions between chips and multiple RDLs, the present invention proposes a new representation to solve multi-layer multi-chip RDL routing problem for the integrated fan-out (InFO) wafer-level chip-scale package (WLCSP).

SUMMARY OF THE INVENTION

In summary, it still lacks an available structure or a method to avoid long detours for multi-layer multi-chip RDL routing. Therefore, the purpose of this invention is to provide a solution for multi-layer multi-chip RDL routing problem. In this invention, a concentric-circle model is proposed to model all the nets between one chip and other chips. Based on this model, the nets to appropriate layers are assigned to avoid long detours. In addition, this model is used to integrate the geometrical information of the pre-assignment nets between chips into a network-flow model, facilitating the outward ring-by-ring stage and detailed routing stage.

In a first aspect of the invention, a redistribution layer routing structure for integrated fan-out wafer-level chip-scale packages is provided. The redistribution layer structure at least comprising: a substrate; at least one redistribution layer over the substrate; and at least one pre-assignment net in the at least one redistribution layer; wherein the at least one pre-assignment net is assigned to the at least one redistribution layer according to a concentric-circle model.

In a second aspect of the invention, a method for a redistribution layer routing is proposed. The method comprises first inputting information regarding a redistribution layer layout into a computer, at least a netlist, and a constraint file. Next, it is creating a concentric-circle model by a computer based on the information, at least the netlist and the constraint file. Subsequently, it is assigning at least one pre-assignment net to at least one redistribution layer by a computer according to the concentric-circle model. Finally, the redistribution layer routing is performed and shown on a display.

In a third aspect of the invention, a method for a redistribution layer routing which is executed in a computer, the method is first inputting information regarding a redistribution layer layout into a computer, at least a pre-assignment netlist, and at least a design rule. Next, at least a pre-assignment net is assigned to at least a redistribution layer by a computer according to a concentric-circle model. Then, it is performing an escape routing for all chips in a fan-in region. Subsequently, it is constructing a flow network and assigning at least a free-assignment net by a computer. Finally, the redistribution layer routing is performed and is displayed on a display.

According to one aspect, the concentric-circle model at least comprises: at least an inner node in an inner circle representing a first I/O pad belonging to a first chip; at least an outer node in an outer circle representing a second I/O pad belonging to at least a second chip; and at least a bond starting from at least the inner node to at least the outer node; wherein at least the pre-assignment net are transformed into at least the bond.

According to one aspect, the concentric-circle model further comprises: a cutting bond for obtaining a maximum set of non-intersecting bonds; and the maximum set of non-intersecting bonds constructed for assigning at least the pre-assignment to at least the redistribution layer.

According to one aspect, a first time to find the maximum set of non-intersecting bonds is $m_i \lg m_i + I_1 + I_2$ and a second time to obtain a maximized set of non-intersecting bonds is $m_i^2 \lg m_i + I_3$.

According to one aspect, at least the netlist includes information regarding at least the pre-assignment net.

According to one aspect, the step of assigning at least the pre-assignment net to at least the redistribution layer comprises determining whether the plurality of bonds intersect in terms of degree by the computer for the first chip.

According to one aspect, the step of assigning at least the pre-assignment net to at least the redistribution layer further comprises: constructing a plurality of interval trees by the computer to find all intersections between the plurality of bonds and a cutting bond for the first chip; and obtaining a maximum set of non-intersecting bonds for the first chip.

According to one aspect, the step of assigning at least the pre-assignment net to at least the redistribution layer further comprises adding at least the redistribution layer by the computer when at least the pre-assignment net is not assigned.

According to one aspect, the method for a redistribution layer routing comprises adding at least the redistribution layer by the computer.

According to one aspect, the step of constructing a flow network and assigning at least a free-assignment net comprises modifying the flow network with the concentric-circle model by a computer.

According to one aspect, the method for a redistribution layer routing which is executed in a computer comprises performing a ring by ring routing by the computer.

According to one aspect, a time complexity of the method is $|Q|(L|B|+|Q|)^2$.

A detailed description is given in the following embodiments with reference to the accompanying drawings.

BRIEF DESCRIPTION OF THE DRAWINGS

The components, characteristics and advantages of the present invention may be understood by the detailed descriptions of the preferred embodiments outlined in the specification and the drawings attached. Embodiments of the invention are illustrated by way of example, and not by way of limitation, in the figures of the accompanying drawings in which like reference numerals refer to similar elements.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
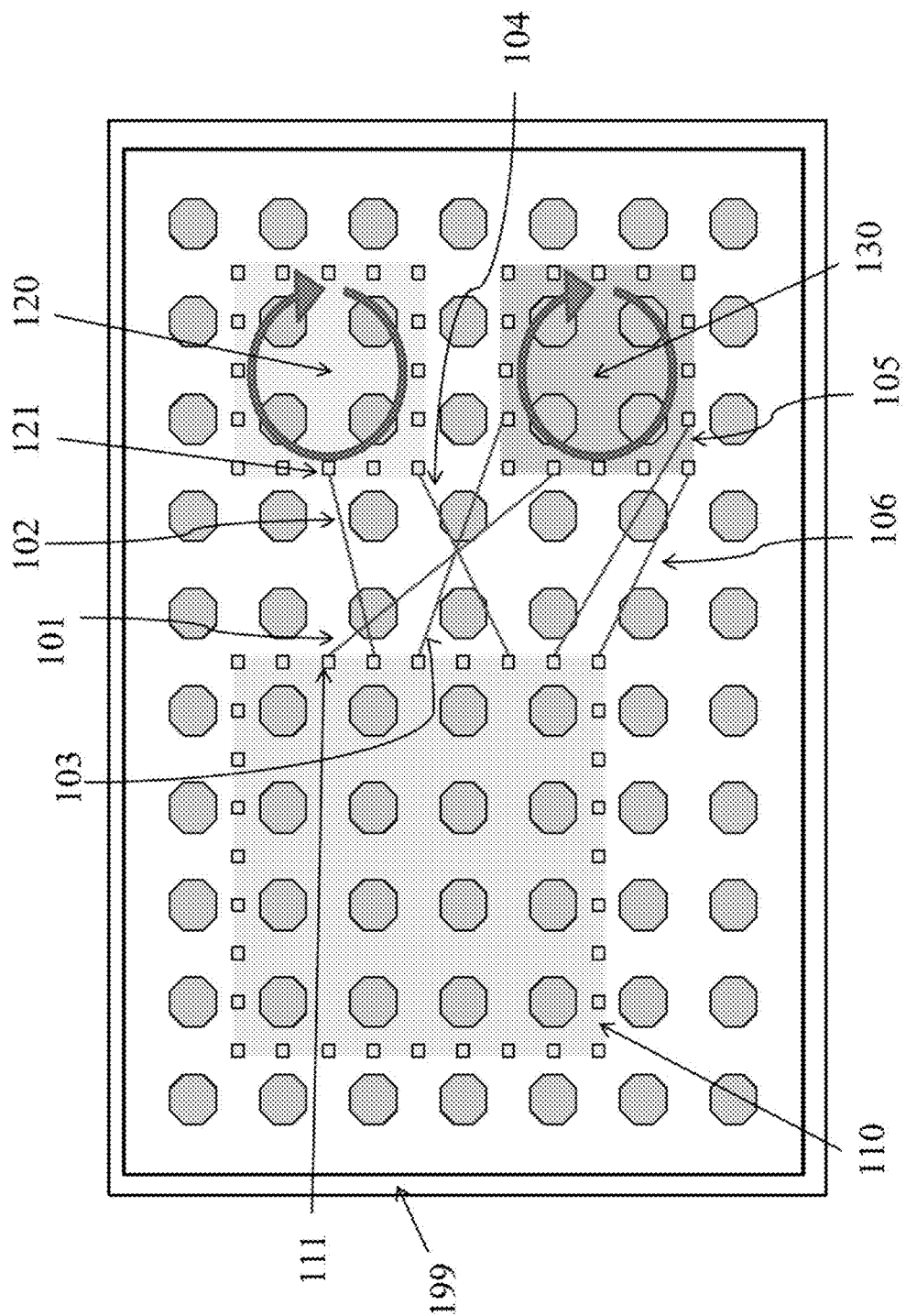
FIG. 1 shows an example of a RDL routing structure according to an embodiment of the invention.

FIG. 1 shows an example of the RDL routing structure according to an embodiment of the invention. To achieve a layer assignment with good quality, a redistribution layer routing structure 100 is proposed to handle the layer assignment problem for all pre-assignment nets. The RDL routing structure can be constructed by a processor capable of operating the electronic design automation (EDA) tool. In one embodiment, the redistribution layer routing structure for integrated fan-out wafer-level chip-scale packages at least comprising: a substrate 199, redistribution layers over the substrate 199 and pre-assignment nets 101, 102, 103, 104, 105, 106 in the redistribution layers; wherein at least the pre-assignment nets 101, 102, 103, 104, 105, 106 is assigned to the redistribution layers according to a concentric-circle model.

Figure 2:
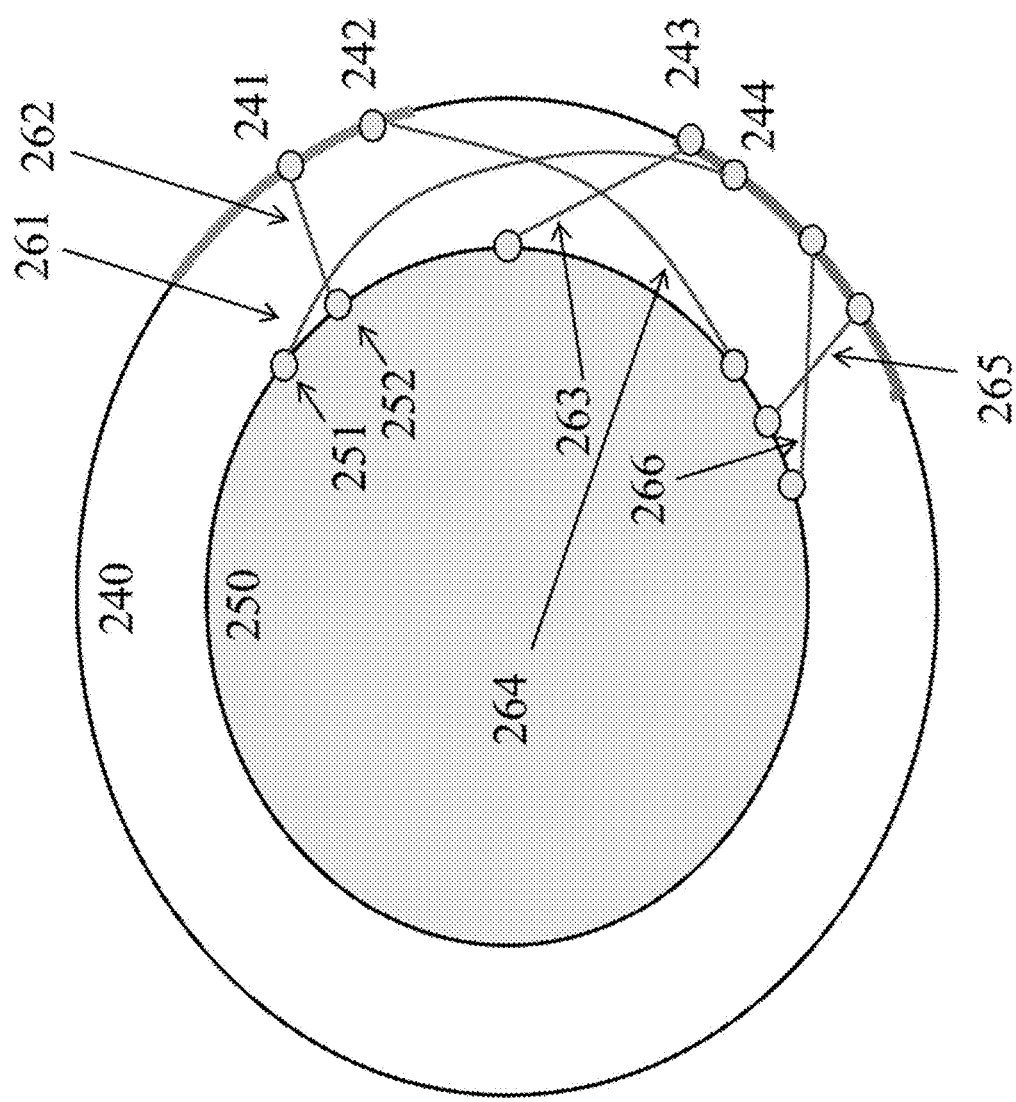
FIG. 2 shows an example of a concentric-circle model according to an embodiment of the invention.

FIG. 2 shows an example of a concentric-circle model according to an embodiment of the invention. Referring to FIG. 1 and FIG. 2, in one embodiment, concentric-circle model consists of two concentric circles 240, 250. The inner circle 250 represents the chip 110, and the region outside the inner circle 250 models the neighboring information of the chip 110. Besides the two circles, there are nodes and bonds in this model. A node in the concentric-circle model contains two types of information: a degree and its associated circle. The degree of a node in this model is the angle from the positive x-axis to the segment formed by the center of circles and the node. If a node is on the inner (outer) circle, we refer it as an inner (outer) node. A bond starts from an inner node to an outer one. The bond can be defined by two degrees and a direction to describe how the bond traverses from the inner node to the outer node. The two degrees of a bond are defined by the degrees of its inner and outer nodes. The direction of a bond is either clockwise or counter-clockwise.

Referring to FIG. 1 and FIG. 2, in one embodiment, the concentric-circle model at least comprises: inner nodes in an inner circle 250 representing I/O pads belonging to a chip, for example, an inner mode 251 in the inner circle 250 representing I/O pad 111 belonging to the chip 110; outer nodes in an outer circle 240 representing I/O pads belonging to other chips, for example, an outer mode 241 representing a I/O pad 121 belonging to the chip 120; and bonds starting from the inner nodes to the outer nodes, for example, a bond 261 starting from the inner node 251 to the outer node 244; wherein the pre-assignment nets 101, 102, 103, 104, 105, 106 are transformed into the bonds 261, 262, 263, 264, 265, 266.

Referring to FIG. 1 and FIG. 2, in one embodiment, a degree interval is defined as a continuous range of degrees. The degree interval of a bond is the range starting from its inner node to its outer one. Each chip to which chip 110 connects can be modeled with a degree interval on the outer circle. The center of the degree interval of a chip is decided by the angle from the positive x-axis to the segment formed by the centers of chip 110 and the chip. The related pre-assignment I/O pads of each chip are mapped to the chip's degree interval starting from the I/O pad which is closest to the continuous interval on boundaries without pre-assignment I/O pads connecting to chip 110 clockwise. Given an inner node and an outer node, there are two possible bonds of opposite directions. One can choose the bond with a smaller degree interval to represent the pre-assignment net to avoid traversing a large portion of the inner circle.

Figures 3A, 3B:
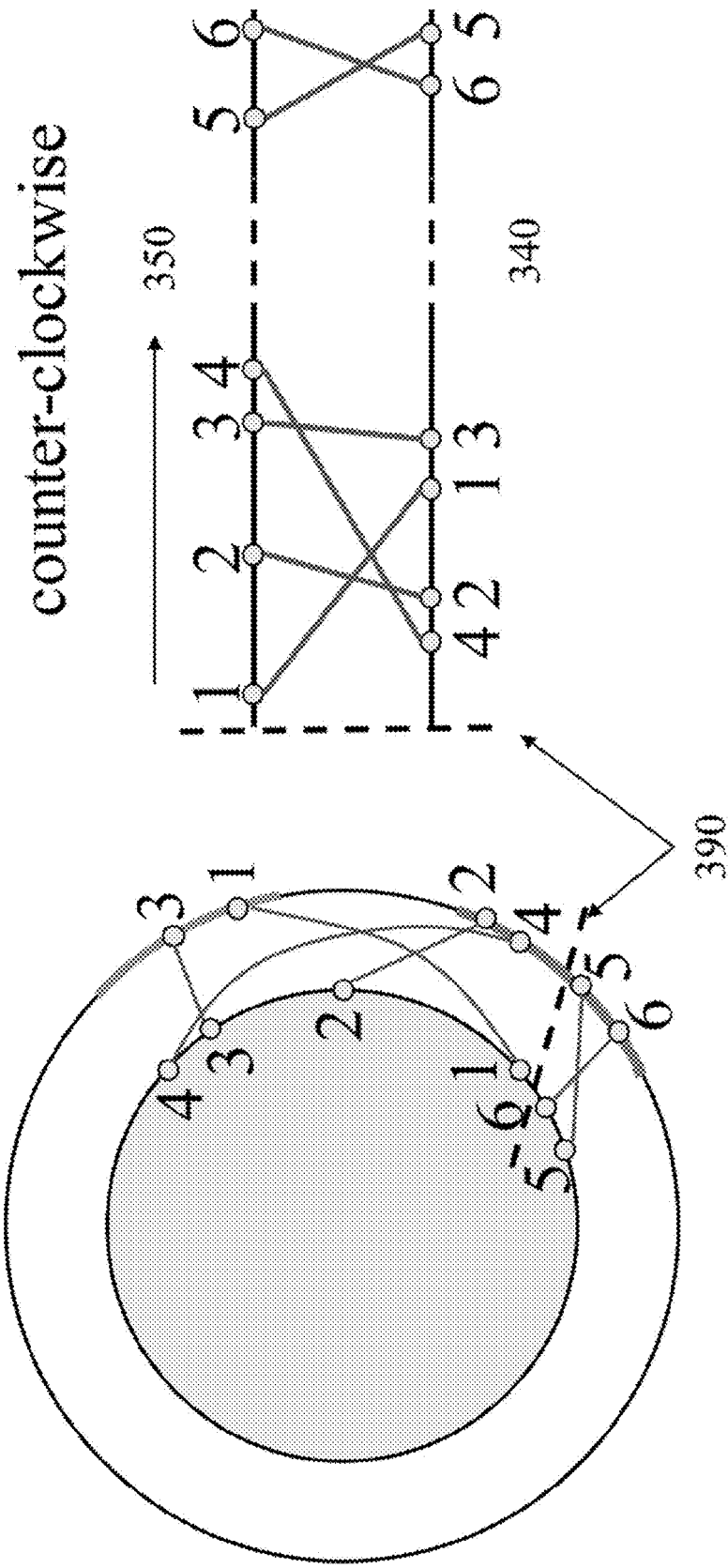
FIGS. 3A and 3B illustrate a set of non-intersecting bonds and the cutting bond according to an embodiment of the invention.
Figure 4:
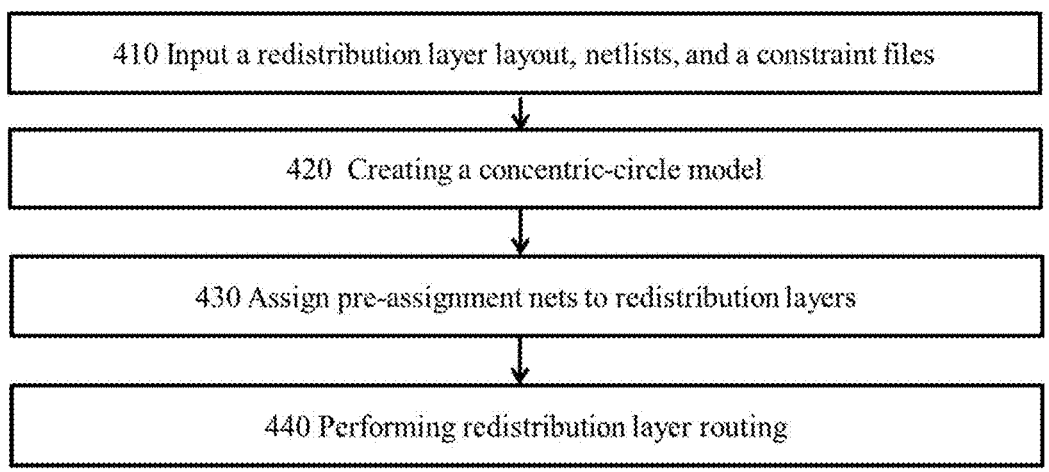
FIG. 4 shows a flow chart illustrating a RDL routing method according to an embodiment of the invention.

In this invention, in some embodiments, if two bonds intersect, assigning the corresponding pre-assignment nets to the same layer would cause an inevitable detour. As a result, it is desirable to find a maximum set of non-intersecting bonds and assign the set of nets to the same layer to minimize the layer number. FIGS. 3A and 3B illustrate a set of non-intersecting bonds and the cutting bond according to an embodiment of the invention. In the invention, the concentric-circle model further comprises a cutting bond 390 for obtaining a maximum set of non-intersecting bonds, wherein the maximum set of non-intersecting bonds constructed for assigning the pre-assignment nets to the redistribution layers. A cutting bond is defined as a bond that does not intersect any bond on the concentric-circle model.

Referring to FIG. 3A and FIG. 3B, in one embodiment, if there is a cutting bond 390, the problem is reduced into an LCS (Longest Common Subsequences) problem by transforming the cyclic structure of the model into a sequential structure. The nodes on the upper (lower) line follow the same order as on the inner (outer) circle, starting from the cutting bond 390 counter-clockwise. If there are reversed numbers between the sequences of upper and inner lines, some bonds intersect. The LCS algorithm can be applied on the two sequences to obtain a maximum set of non-intersecting bonds.

To achieve a layer assignment with good quality, a redistribution layer routing method 400 is proposed to handle the layer assignment problem for all pre-assignment nets. The RDL routing method 400 can be constructed by a processor capable of operating the electronic design automation (EDA) tool. In one embodiment, the method 400 is executed in a computer to perform a redistribution layer routing which may be described by a set of devices and wires connected thereon.

As shown in a step 410, first, information regarding a redistribution layer layout, a netlist, and a constraint file are input into a computer by a processor. It is known that the netlists include pre-assignment netlists and other netlists. The constraint file could be design rules. The constraints can be done by designers or by automatic pattern recognition. In other embodiments, the design constraints can be stored in another file other than the Simulation Program with Integrated Circuit (SPICE) file. Information regarding a redistribution layer layout is related to information of InFO WLCSPs, such as signal pads, I/O pads, power pins, power consumption and micro-bumps.

As shown in a step 420, it is creating a concentric-circle model by a computer based on the information, the netlists and the constraint file. Referring to FIG. 1 and FIG. 2, in one embodiment, the concentric-circle model at least comprises: inner nodes in an inner circle 250 representing I/O pads belonging to a chip, for example, an inner mode 251 in the inner circle 250 representing I/O pad 111 belonging to the chip 110; outer nodes in an outer circle 240 representing I/O pads belonging to other chips, for example, an outer mode 241 representing a I/O pad 121 belonging to the chip 120; and bonds starting from the inner nodes to the outer nodes, for example, a bond 261 starting from the inner node 251 to the outer node 244; wherein the pre-assignment nets 101, 102, 103, 104, 105, 106 are transformed into the bonds 261, 262, 263, 264, 265, 266.

As shown in a step 430, pre-assignment nets are assigned to redistribution layers by a computer according to the concentric-circle model. In one embodiment, the step 430 comprises a step: determining whether bonds intersect in terms of degree. Referring to FIG. 3A and FIG. 3B, in order to find a cutting bond, whether two bonds intersect in terms of degrees is determined. If the directions of two bonds are the same, two bonds intersect if and only if the degree interval of one bond completely lies within the other one. If the directions of two bonds are different, two bonds intersect if and only if the degree intervals of the two bonds share some degrees. If any two bonds intersect, some degree intervals on the two circles are excluded from consideration because no cutting bond will co-exist with an intersection. Based on intersections among bonds on the concentric-circle model, the candidate degrees on the two circles for a cutting bond 390 can be identified. Therefore, two interval trees are constructed by a computer to find all the intersections between all the bonds and identify the excluded degree intervals on the two circles.

One of the interval trees represents the degree intervals of the clockwise bonds, and the other represents the degree intervals of counter-clockwise bonds. Then, candidate degree intervals on the two circles are obtained. It is to choose a degree on any inner candidate degree interval and form bonds with all outer candidates. Then, the interval trees are used to find a cutting bond. If there is no cutting bond, it is possible to find a bond intersecting the minimized number of the bonds on the concentric-circle model, and to remove these bonds and convert the problem into an LCS problem. The candidate inner (outer) degrees of the bond are any degree of degree intervals between any two adjacent nodes on the inner (outer) circle. Again, the two interval trees can be used to find the bond intersecting the minimized number of the bonds on the model.

It should be noted that this invention assigns a number of pre-assignment nets for one chip and proceeds to the other chips on the same layer. It is processing to a new layer if there are pre-assignment nets yet to be assigned. If some of the pre-assignment nets of the chip, for example, chip 110, have been assigned to the same layer, the original problem is decomposed into multiple LCS problems due to the corresponding bonds. Besides, if some previously assigned pre-assignment nets which do not connect to the chip, the concentric-circle model needs to be updated by trimming nodes on the corresponding degree intervals on the outer circle. As shown in a step 440, finally, the redistribution layer routing is performed.

Referring to FIG. 1, in one embodiment, the method 400 is executed in a computer, and the redistribution layer routing is finally performed and displayed on a display. Therefore, a solution of the layer-assignment problem can be found and displayed on a display. The pre-assignment nets corresponding to non-intersecting bonds are assigned to the same redistribution layers via the interval trees and the cutting bonds. For example, the display shows a solution which assigns the pre-assignment nets 102, 103, 106 to the same layer and assigns the pre-assignment nets 104, 105 to another layer.

Referring to FIG. 3A and FIG. 3B, the time complexity of the method 400 can be calculated by a computer. If there is a cutting bond, our method finds a maximum set of non-intersecting bonds in $O(m_i \lg m_i + I_1 + I_2)$ time; otherwise, the method obtains a maximized set of non-intersecting bonds in $O(m_i^2 lgm_i+I_3)$ time, where $m_i$ is the number of the pre-assignment nets of a chip, for example, chip 110, $I_1$ is the number of the intersections between bonds of pre-assignment nets, $I_2$ is the number of the intersections discovered in the checking process for finding a cutting bond, and $I_3$ is the number of the intersections discovered in the process for finding a bond intersecting the least number of the bonds.

The concentric-circle model is in $O(m_i)$ time, where $m_i$ is the number of the pre-assignment nets of the chip, for example, chip 110. The two interval trees can be obtained in $O(m_i lgm_i)$ time. The time complexity of querying all the intersections between all the bonds is $O(m_i lgm_i+I_1)$. Because the number of candidate degree intervals on the outer circle is $O(m_i)$, a cutting bond (if it exists) in $O(m_i lgm_i+I_2)$ time can be obtained. Finally, the LCS algorithm whose time complexity is $O(m_i lgm_i)$ can be applied. Note that the numbers on the upper (lower) line are all different, the time complexity is thus reduced from $O(m_i^2)$ to $O(m_i lgm_i)$. If there is no cutting bond, one can try $O(m_i^2)$ choices of bonds to find out the bond intersecting the least number of the bonds on the model in $O(m_i^2 lgm_i+I_3)$ time.

Figure 5:
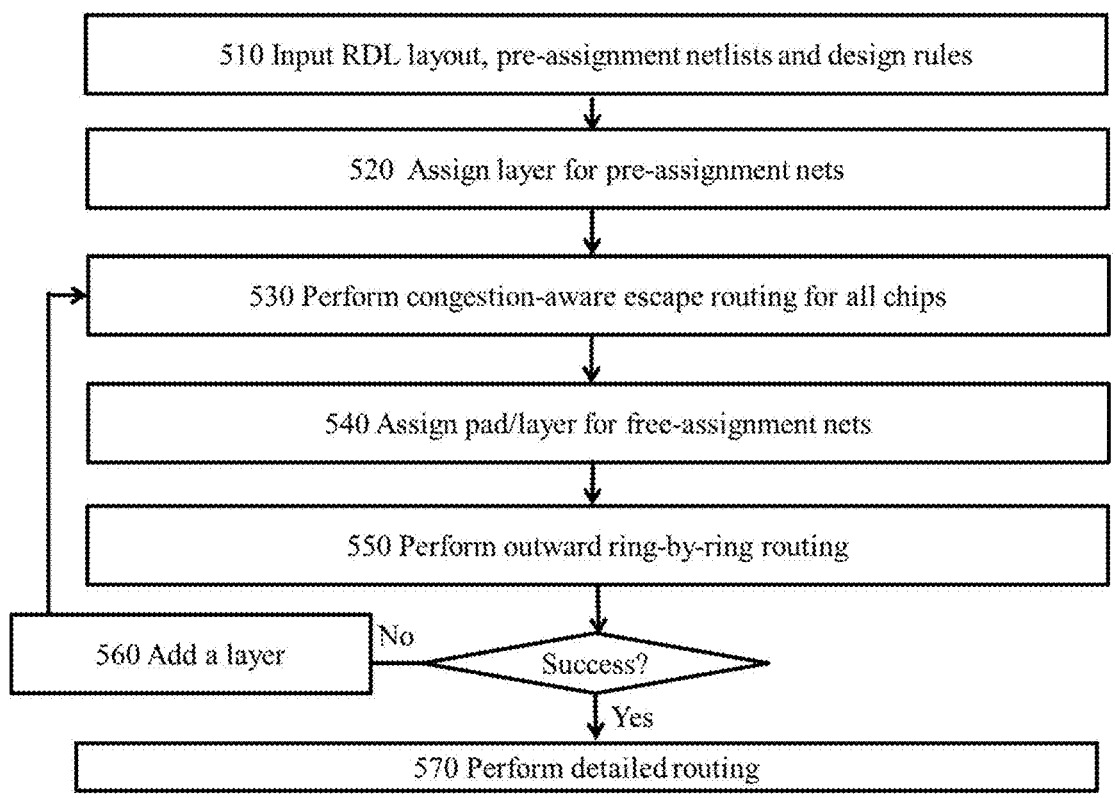
FIG. 5 shows a flow chart illustrating a RDL routing method according to an embodiment of the invention.

FIG. 5 shows a flow chart illustrating a RDL routing method according to an embodiment of the invention. The RDL routing method 500 can be constructed by a processor capable of operating the electronic design automation (EDA) tool. In one embodiment, the method 500 is executed in a computer to perform a redistribution layer routing which may be described by a set of devices and wires connected thereon. As shown in a step 510, it is inputting information regarding a redistribution layer layout, pre-assignment netlists, and design rules into a computer. The redistribution layer layout is related to information of InFO WLCSPs, such as signal pads, I/O pads, power pins, power consumption and micro-bumps. As shown in a step 520, pre-assignment nets are assigned to redistribution layers according to a concentric-circle model. In some embodiments, the step 520 can be described in greater detail as the method 400.

As shown in a step 530, an escape routing for all chips in a fan-in region is performed. In one embodiment, after finishing the layer assignment for pre-assignment nets, escape routing for all chips considering congestion information is performed to finish the routing in the fan-in region. The escape routing problem is to route specified bump pads in a bump pad array to the boundaries of the array. Because multiple chips share the same RDLs, the routing resource allocation in the fan-out region during escape routing should be considered. Based on the tile model (T. Yan and M. D. F. Wong, "Correctly Modeling the Diagonal Capacity in Escape Routing," IEEE TCAD, vol. 31, no. 2, pp. 285-293, 2012), some modifications can be further made to perform escape routing while minimizing potential routing congestion.

As shown in the step 530, in one embodiment, to handle multiple layers, one can duplicate some vertices and edges for each layer without duplicating the vertices for bump pads. After the flow network construction, the minimum-cost maximum-flow (MCMF) algorithm can be applied to obtain escaped routes while minimizing the total wire-length. It is adjusting the capacities of the edges connected to the sink vertex to control every maximum number of routes passing through all intervals of the array boundaries. To decide the value of its capacity, the cost (not the cost in the flow network) can be calculated for each edge connecting to the sink vertex. The cost contains the bipartite cost $C_B$ and the pre-assignment cost $C_P$.

$$\text{cost}=\alpha C_B+\beta C_P,$$

where $\alpha$ and $\beta$ are user-defined parameters. $C_P$ is equal to the number of neighboring pre-assignment I/O pads on the same layer. For $C_B$, we construct a bipartite graph $G_B=(V_B, E_B)$, where $V_B$ is a set of vertices corresponding to all the free-assignment I/O pads and bump pads, and $E_B$ is a set of edges. For a free-assignment I/O pad and a fan-out bump pad, an edge between their corresponding vertices is constructed. For a free-assignment I/O pad $q_j^i$ and a fan-in bump $b_{jk}^i$ (both pads belong to the chip $C_i$), an edge between their corresponding vertices is constructed. Each edge has an associated weight which equals the Euclidian distance between the corresponding pads. Then, one can perform the minimum weight maximum cardinality bipartite matching algorithm. For each edge connecting to the sink vertex, the corresponding bipartite cost is the sum of the matched edge weights of the neighboring free-assignment I/O pads. The capacity of an edge connecting to the sink vertex is proportional to the cost and less than O-cap.

As shown in a step 540, a flow network is constructed and free-assignment nets are assigned. In one embodiment, after the step 530, a flow network is constructed and the minimum-cost maximum-flow (MCMF) algorithm is applied to assign all free-assignment I/O pads to the fan-in region (the escaped routes and the outermost bump pads of bump pad arrays inside the chips) and the fan-out region (the fan-out bump pads). One can refer to the outermost bump pads of bump pad arrays inside the chips as boundary bump pads. In the step 540, it is noted that information of the finished routes in the fan-in region and the layer-assignment results of pre-assignment nets have been layout (actual routes are yet to be determined). To fully integrate all the layout information into our flow network model, one can remove some edges while considering the pre-assignment nets.

As shown in the step 540, first, the construction of the flow network is introduced. Then, the flow network considering the pre-assignment nets is modified. Every free-assignment I/O pad and every escaped route correspond to a vertex in the flow network. For each fan-out and boundary bump pad, L duplicated vertices are created to represent the same location bump pad on each layer, where L is the current number of layers. To ensure that each fan-out and boundary bump pad is assigned only on one layer, another vertex as a super vertex is created for each fan-out and boundary bump pad. In addition, two super vertices, which are the source vertex and the sink vertex, are created in the flow network. There are six types of directed edges, and every edge has a unit capacity. Edges from the vertex for a free-assignment I/O pad to the L duplicated vertices for a fan-out bump pad or a neighboring boundary bump pad. Edge from the vertex for a free-assignment I/O pad to the vertex for a neighboring escaped route. Edges from the L duplicated vertices for a fan-out bump pad or boundary bump pad to the super vertex for the same bump pad. Edge from the source vertex to the vertex for a free-assignment I/O pad. Edge from the super vertex for a fan-out bump pad or boundary bump pad to the sink vertex. Edge from the vertex for an escaped route to the sink vertex. The edge cost of the first type is the Euclidian distance between the two pads. The edge cost of the second type is the wire-length of the escaped route plus the Euclidian distance between the I/O pad and the bump pad array boundary location of the escaped route. All the other edges have zero costs.

As shown in the step 540, in some embodiment, to consider the pre-assignment nets, it is needed to remove some edges in the flow network to avoid potential detours or routing failures. In one embodiment, the concentric-circle model can be used to identify edges which might lead to detours and to remove them. For each chip on each layer, one can first construct a concentric-circle model with bonds of the pre-assignment nets of the chip on the layer. To map a pre-assignment or a free-assignment net to a bond, the degree of its outer node is decided by the angle from the positive x-axis to the segment formed by the center of the chip to the I/O pad or the bump pad. After the construction of the concentric-circle model for each chip on each layer, all the to-be-checked degree intervals are formed based on the pre-assignment nets. Then, construct an interval tree to store all the to-be-checked degree intervals for each chip on each layer. It is using interval trees to decide whether edges of the overall flow network may need to be removed to avoid potential detours. Finally, check the results obtained by the interval trees to actually remove them by the physical locations of the pads.

Because the step 540 use the Euclidian distance as the cost metric and consider the pre-assignment nets, very few crossings will be introduced. In addition, one can distribute I/O pads to all the layers evenly by adjusting the edge costs. There is an additional cost on the edges from an I/O pad to the vertices on some layers. Because there is a minimum distance between an I/O pad and a bump pad, one can choose the additional cost small enough which would not violate the property. Hence, the result of the MCMF algorithm is a good assignment topology which facilitates the following steps.

As shown in the step 540, the overall time complexity of this method is $O(|Q|(L|B|+|Q|)^2)$, where Q is the set of all the I/O pads, L is the current number of layers, and B is the set of all the bump pads.

In this invention, as shown in the step 540, after assigning pad/layer for free-assignment nets, all connections of I/O pads are determined. It is noted that the method 500 further comprises a step 550: performing outward ring-by-ring routing. In the step 550, in one embodiment, the routing topology for each net in the fan-out region will be presented, based on a ring-by-ring, chip-by-chip scheme. Starting from the I/O pads, for each ring formed by the bump pads, correct ring passing points for all I/O connections in the fan-out region will be assigned. To correctly assign the ring passing points, it is needed to fix two types of violations between two adjacent rings: (1) the net order violation and (2) the tile capacity violation. Because net crossings are not allowed, the net order on any two adjacent rings should match. Besides, one should check if a given set of currently assigned net segments can pass through a tile simultaneously. First, net order violations by either reassigning some I/O pads to bump pads can be fixed, detouring the pre-assignment net, or reassigning some I/O pads to escaped routes or boundary bump pads in the fan-in region. Pre-assignment nets break two adjacent rings into many segments. The net orders of two corresponding segments on the inner and outer rings should be the same. If all order violations are free-assignment nets, reassign them to correct the order. If a net order violation involved a pre-assignment net, it is necessary to detour the pre-assignment net or reassign free-assignment I/O pads to the fan-in region with unassigned escaped routes or boundary bump pads.

As shown in the step 550, after correcting all net order violations, check capacities of tiles by the tile routability analyzer. The analyzer can check if a given set of currently assigned net segments can pass through a tile simultaneously in constant time. If a tile capacity violation occurs, cluster the tile with an adjacent tile to push some net segments into the adjacent tile. It may need to cluster more adjacent tiles to fix a tile capacity violation. In addition, some I/O pads to escaped routes or boundary bump pads in the fan-in region can be reassigned as well. In the step 570, detailed routing can be performed if the method 500 is successful. While the method 500 is failed to route, it is possible to add an additional layer and return to the step 530.

In the present invention, the redistribution layer routing method was implemented in the C++ language on a Linux workstation with a 2.97 GHz Intel Xeon CPU and 48 GB memory. The benchmark circuits are listed in Table 1, where "#Chips", "|Q|", "|B|", and "|N|" denote the numbers of chips, I/O pads, bump pads, and pre-assignment nets, respectively. In the table 1, FA-maze is a conventional method which routes all the free-assignment nets using the network-flow-based method, and routes all the pre-assignment nets sequentially by maze routing. If FA-maze fails to complete the routing process using the current number of layers, one more layer would be added. In this experiment, an upper bound on the maximum number of layers is set to three. The experimental results are shown in Table 1. The number of layers, the routability, the total wirelength, and the runtime are reported. From the results, our algorithm achieves 100% routibility for each circuit, while FA-maze fails to obtain a routing solution with more layers than the present invention. Further, the present invention runs 20.8× faster than FA-maze. The results show that the present invention is effective and efficient for the RDL routing for the InFO WLCSP.

TABLE 1

| Circuits | #Chips | |Q| | |B| | |N| | #Layers FA-maze | #Layers Ours | Routability (%) FA-maze | Routability (%) Ours | Total Wirelength (µm) FA-maze | Total Wirelength (µm) Ours | Runtime (sec) FA-maze | Runtime (sec) Ours |
|---|---|---|---|---|---|---|---|---|---|---|---|---|
| info1 | 3 | 612 | 672 | 44 | 3 | 2 | 95.4 | 100.0 | N/A | 142102 | 52 | 3 |
| info2 | 3 | 1275 | 1364 | 89 | 3 | 2 | 93.5 | 100.0 | N/A | 514216 | 759 | 36 |
| info3 | 3 | 1398 | 1600 | 107 | 3 | 2 | 92.4 | 100.0 | N/A | 611851 | 1117 | 41 |
| info4 | 2 | 1672 | 1920 | 156 | 3 | 2 | 90.8 | 100.0 | N/A | 851808 | 1723 | 85 |
| info5 | 4 | 3670 | 3720 | 376 | 3 | 3 | 89.3 | 100.0 | N/A | 1968153 | 15512 | 859 |
| Comparisons | | | | | — | — | 0.92 | 1.00 | — | — | 20.80 | 1.00 |

In this invention, an RDL routing structure and method with concentric-circle model for the InFO WLCSP are presented. In order to handle the layer-assignment problem for pre-assignment nets, the concentric-circle model is proposed to model all the nets between one chip and all the other chips. Based on this model, the nets are assigned to appropriate layers to avoid long detours. In addition, this model is used to integrate the geometrical information of the pre-assignment nets between chips into a network-flow model, and the result can facilitate the following outward ring-by-ring stage and the detailed routing stage. Experimental results demonstrate the high quality and efficiency of this invention.

The main contributions of this invention are summarized as follows:

(a) The present invention formulates the unified-assignment, multi-layer multi-chip RDL routing problem for the integrated fan-out (InFO) wafer-level chip-scale packaging (WLCSP) and propose the first algorithm to solve this problem.
(b) The present invention proposes a novel structure with a concentric-circle model to reflect the geometrical information of pad connections. Based on this model, all the pre-assignment nets of a chip can be simultaneously considered and the layer assignment problem can be better solved. In particular, our proposed method guarantees to find an optimal layer-assignment solution for a chip for some specific cases.
(c) The present invention presents a flow network to perform pad/layer assignment for free-assignment nets. Further, the present invention integrates the geometrical information of pre-assignment nets into the flow network based on the proposed concentric-circle model. By considering pre-assignment nets with free-assignment nets, detours of pre-assignment nets caused by free-assignment nets can be effectively reduced.
(d) Experimental results show that the proposed methods outperform the existing work on layer assignment, wire length and runtime for real industry designs. The experimental results also show the effectiveness and efficiency of our method. Specifically, the router in the present invention achieves 100% routability for all the given testcases.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A redistribution layer routing structure which is constructed by a set of devices and wires connected thereon for integrated fan-out wafer-level chip-scale packages at least comprising:
    a substrate;
    at least one redistribution layer over said substrate; and
    at least one pre-assignment net in said at least one redistribution layer;
    wherein said at least one pre-assignment net is assigned to said at least one redistribution layer according to a concentric-circle layout model;
    wherein said concentric-circle layout model at least comprises:
        at least one inner node in an inner circle representing a first I/O pad belonging to a first chip;
        at least one outer node in an outer circle representing a second PO pad belonging to at least a second chip; and
        at least one bond starting from said at least one inner node to said at least one outer node;
    wherein said at least one pre-assignment net is transformed into said at least one bond.

2. The structure of claim 1, wherein said concentric-circle layout model further comprises a cutting bond for obtaining a maximum set of non-intersecting bonds; wherein said maximum set of non-intersecting bonds constructed for assigning said pre-assignment nets to said redistribution layers.

3. The structure of claim 2, wherein a first time to find said maximum set of non-intersecting bonds is $m_i \lg m_i + I_1 + I_2$ and a second time to obtain a maximized set of non-intersecting bonds is $m_i^2 \lg m_i + I_3$.

4. A method for a redistribution layer (RDL) routing which is executed in a computer, the method at least comprising:
    inputting information regarding a redistribution layer layout, at least a netlist, and a constraint file into said computer;
    creating a concentric-circle layout model based on said information, at least said netlist and said constraint file by said computer;

assigning at least a pre-assignment net to at least a redistribution layer according to said concentric-circle layout model by said computer; and performing said redistribution layer routing, and displaying said redistribution layer routing on a display;

wherein said concentric-circle layout model at least comprises:

at least one inner node in an inner circle representing a first I/O pad belonging to a first chip;

at least one outer node in an outer circle representing a second I/O pad belonging to at least a second chip; and at least one bond starting from said at least one inner node to said at least one outer node;

wherein said at least one pre-assignment net are transformed into said at least one bond.

5. The method of claim 4, wherein at least said netlist includes at least said pre-assignment net.

6. The method of claim 4, wherein the step of assigning at least said pre-assignment net to at least said redistribution layer comprises determining whether said plurality of bonds intersect in terms of degrees for said first chip by said computer.

7. The method of claim 6, wherein the step of assigning at least said pre-assignment net to at least said redistribution layer further comprises:

constructing a plurality of interval trees by a computer to find all intersections between said plurality of bonds and a cutting bond for said first chip; and obtaining a maximum set of non-intersecting bonds by a computer for said first chip.

8. The method of claim 7, wherein the step of assigning at least said pre-assignment net to at least said redistribution layer further comprises adding at least said redistribution layer when at least said pre-assignment net is not assigned by said computer.

9. The method of claim 8, wherein a first time to find said maximum set of non-intersecting bonds is $m_r \lg m_r + I_1 + I_2$ and a second time to obtain a maximized set of non-intersecting bonds is $m_r^2 \lg m_r + I_3$.

10. A method for a redistribution layer routing which is executed in a computer, the method comprising:

inputting information regarding a redistribution layer layout, at least a pre-assignment netlist, and at least a design rule into said computer;

assigning at least a pre-assignment net to at least a redistribution layer according to a concentric-circle layout model by said computer;

performing an escape routing for all chips in a fan-in region to route specified bump pads in a bump pad array to boundaries of said array by said computer;

constructing a flow network and assigning at least a free-assignment net by said computer; and performing said redistribution layer routing, and displaying said redistribution layer routing on a display;

wherein said concentric-circle layout model at least comprises:

at least one inner node in an inner circle representing a first I/O pad belonging to a first chip;

at least one outer node in an outer circle representing a second I/O pad belonging to a least a second chip; and at least one bond starting from said at least one inner node to said at least one outer node;

wherein at least said pre-assignment net is transformed into at least said bond.

11. The method of claim 10, wherein said method comprises performing a ring by ring routing by said computer.

12. The method of claim 10, wherein said method comprises adding at least said redistribution layer by said computer.

13. The method of claim 10, wherein the step of assigning at least said pre-assignment net to at least said redistribution layer comprises determining whether said plurality of bonds intersect in terms of degrees for said first chip by said computer.

14. The method of claim 13, wherein the step of assigning at least said pre-assignment net to at least said redistribution layer further comprises:

constructing a plurality of interval trees by said computer to find all intersections between said plurality of bonds and a cutting bond for said first chip; and obtaining a maximum set of non-intersecting bonds by said computer for said first chip.

15. The method of claim 10, wherein the step of constructing a flow network and assigning at least a free-assignment net comprises modifying said flow network by a computer with said concentric-circle model.

16. The method of claim 15, wherein a time complexity of said method is $|Q|(L|B|+|Q|)^2$.

* * * * *